(12) United States Patent
Kim

(10) Patent No.: US 10,514,792 B2
(45) Date of Patent: Dec. 24, 2019

(54) DISPLAY DEVICE AND METHOD OF DRIVING THE DISPLAY DEVICE

(71) Applicant: SAMSUNG DISPLAY CO., LTD., Yongin-si, Gyeonggi-do (KR)

(72) Inventor: Sun Hwa Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/793,321

(22) Filed: Oct. 25, 2017

(65) Prior Publication Data
US 2018/0157361 A1 Jun. 7, 2018

(30) Foreign Application Priority Data

Dec. 5, 2016 (KR) .................... 10-2016-0164658

(51) Int. Cl.
*G06F 3/045* (2006.01)
*G06F 3/041* (2006.01)
*G06F 3/044* (2006.01)
*G06K 9/00* (2006.01)

(52) U.S. Cl.
CPC ............ *G06F 3/0412* (2013.01); *G06F 3/044* (2013.01); *G06K 9/0004* (2013.01); *B32B 2457/208* (2013.01); *G06F 2203/04102* (2013.01); *G06F 2203/04103* (2013.01); *G06K 9/00087* (2013.01)

(58) Field of Classification Search
USPC ................ 345/173, 174, 156, 634, 1.3, 667; 717/106; 434/362
See application file for complete search history.

(56) References Cited

U.S. PATENT DOCUMENTS

| | | | |
|---|---|---|---|
| 9,046,975 B2 | 6/2015 | Kang et al. | |
| 9,299,314 B2 | 3/2016 | Lee et al. | |
| 9,448,587 B2 | 9/2016 | Park | |
| 9,529,383 B2 | 12/2016 | Chun et al. | |
| 2002/0091991 A1* | 7/2002 | Castro ................ | G06F 9/06 717/106 |
| 2011/0020782 A1* | 1/2011 | Ko .................... | G09B 5/02 434/362 |
| 2012/0162099 A1 | 6/2012 | Yoo et al. | |
| 2013/0342480 A1 | 12/2013 | Moon et al. | |

(Continued)

FOREIGN PATENT DOCUMENTS

| KR | 101341737 B1 | 12/2013 |
|---|---|---|
| KR | 1020140100335 A | 8/2014 |

(Continued)

*Primary Examiner* — Thuy N Pardo
(74) *Attorney, Agent, or Firm* — Cantor Colburn LLP

(57) ABSTRACT

A display device includes a first display unit and a first sensor unit provided on one surface of the first display unit, a second display unit and a second sensor unit provided on one surface of the second display unit, a third sensor unit provided between the first sensor unit and the second sensor unit and a driver unit including a display driver which controls the first display unit and the second display unit, a sensor driver which controls the first, second and third sensor units, and a mapping controller which maps a position information of a touch input detected from a sensing signal of the second sensor unit into a corresponding position information on the first display unit.

21 Claims, 14 Drawing Sheets

(56) References Cited

U.S. PATENT DOCUMENTS

| | | | |
|---|---|---|---|
| 2015/0015522 A1* | 1/2015 | Eriksson | G06F 1/1616 345/173 |
| 2015/0097755 A1* | 4/2015 | Kim | G06F 3/1446 345/1.3 |
| 2015/0220118 A1* | 8/2015 | Kwak | G06F 1/1652 345/667 |
| 2015/0220119 A1* | 8/2015 | Seo | G06F 3/041 345/173 |
| 2015/0325216 A1* | 11/2015 | Park | G06F 1/16 345/634 |
| 2016/0011689 A1 | 1/2016 | Kim et al. | |
| 2016/0048170 A1* | 2/2016 | Kim | G06F 3/0414 345/173 |
| 2016/0085319 A1* | 3/2016 | Kim | G06F 3/0346 345/156 |
| 2016/0309321 A1* | 10/2016 | Song | G06F 3/0488 345/174 |
| 2018/0059717 A1* | 3/2018 | Kim | G06F 3/0488 345/173 |
| 2018/0130447 A1* | 5/2018 | Ent | G09G 5/14 345/174 |

FOREIGN PATENT DOCUMENTS

| | | |
|---|---|---|
| KR | 1020150096952 A | 8/2015 |
| KR | 1020140054746 A | 1/2016 |
| KR | 1020160008726 A | 1/2016 |

\* cited by examiner

DISPLAY DEVICE AND METHOD OF DRIVING THE DISPLAY DEVICE

This application claims priority to Korean Patent Application No. 10-2016-0164658, filed on Dec. 5, 2016, and all the benefits accruing therefrom under 35 U.S.C. § 119, the content of which in its entirety is herein incorporated by reference.

BACKGROUND

1. Field

Exemplary embodiments of the invention relate to a display device and a method of driving the display device.

2. Description of the Related Art

There has been a growing demand for a double-sided display device capable of displaying an image on both surfaces or being folded to increase utilization and portability of the display device. In addition, a touch sensor allowing a user to conveniently provide an input while the user views an image displayed on a screen has been widely used as input means of a display device.

SUMMARY

Exemplary embodiments of the invention direct to a display device providing a touch input and a display function on at least both surfaces thereof to improve usability, and a method of driving the display device.

According to an exemplary embodiment of the invention, a display device includes a first display unit and a first sensor unit provided on one surface of the first display unit, a second display unit and a second sensor unit provided on one surface of the second display unit, a third sensor unit provided between the first sensor unit and the second sensor unit and a driver unit including a display driver which controls the first display unit and the second display unit, a sensor driver which controls the first, second and third sensor units, and a mapping controller which maps a position information of a touch input detected from a sensing signal of the second sensor unit into a corresponding position information on the first display unit.

In an exemplary embodiment, the driver unit may activate the mapping controller in response to a predetermined control signal and may control the first display unit based on the corresponding position information.

In an exemplary embodiment, the display device may further comprise a third sensor unit provided between the first and second sensor units and the mapping controller may be activated in response to a sensing signal of the third sensor unit.

In an exemplary embodiment, the sensor driver may turn off the third sensor unit when a double-sided interlocking mode to activate the mapping controller is executed.

In an exemplary embodiment, the sensor driver may activate a partial area of the second sensor unit and turns off remaining areas of the second sensor unit when a double-sided interlocking mode to activate the mapping controller is executed.

In an exemplary embodiment, the mapping controller may be activated in response to a sensing signal input from at least one of the first and second sensor units or a control signal input from a predetermined option key.

In an exemplary embodiment, the driver unit may control an image or contents displayed on a screen of the first display unit based on the position information output from the mapping controller.

In an exemplary embodiment, the driver unit may display a point mapped on a screen of the first display unit based on the position information output from the mapping controller.

In an exemplary embodiment, the first and second sensor units may be disposed opposite to each other with respect to the first and second display units which are interposed therebetween, and the third sensor unit is disposed on the same side surface of the first and second display units and connected between the first and second sensor units.

In an exemplary embodiment, the first and second display units may be integrally connected to be included in one foldable display panel together, and the first, second, and third sensor units are integrally connected to be provided on one surface of the foldable display panel.

In an exemplary embodiment, the display device may be folded along a predetermined folding axis arranged on an area of the third sensor unit.

In an exemplary embodiment, the first sensor unit may include a mutual capacitive touch sensor, and the second sensor unit includes a self-capacitive touch sensor.

In an exemplary embodiment, the display device may include a fingerprint sensor provided on at least one of the second display unit and the second sensor unit.

In an exemplary embodiment, the driver unit may further include a fingerprint sensor provided on at least one of the second display unit and the second sensor unit.

In an exemplary embodiment, the driver unit further comprises a fingerprint identification unit which identifies an effective touch input provided to the second sensor unit by using fingerprint information detected from the fingerprint sensor.

In an exemplary embodiment, a touch input provided to the third sensor unit is classified as a plurality of touch events, and a predetermined operation is performed based on each of the plurality of touch events.

In an exemplary embodiment, on/off states of at least one of the first and second display units, and the first, second, and third sensor units may be controlled based on each of the plurality of touch events.

In an exemplary embodiment, touch inputs successively provided to the third sensor unit within a predetermined time may be counted and the predetermined operation is performed based on a count.

According to an exemplary embodiment of the invention, a method of driving a display device including a first display unit and a second display unit overlapping each other, a first sensor unit and a second sensor unit provided on respective surfaces of the first and second display units, and a third sensor unit provided on side surfaces of the first and second display units, the method including receiving a control signal, executing a double-sided interlocking mode in response to the control signal, receiving a touch input provided to the second sensor unit and detecting a position of the touch input, mapping and converting the position information of detected touch input into a corresponding area information on the first display unit, and controlling the first display unit based on the corresponding area information.

In an exemplary embodiment, the method may include generating the control signal based on a touch input provided to the third sensor unit.

In an exemplary embodiment, the third sensor unit may be turned off when the double-sided interlocking mode is executed.

In an exemplary embodiment, the method may further include generating fingerprint information by using a fingerprint sensor, and identifying an effective touch input provided to the second sensor unit based on the fingerprint information.

DETAILED DESCRIPTION

Figure 1:
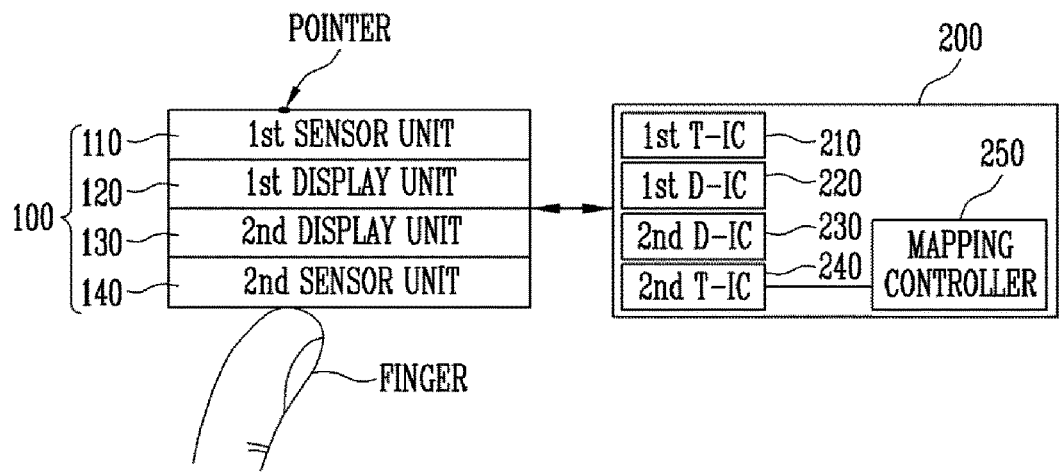
FIG. 1 illustrates a block diagram of an exemplary embodiment of a display device.

Hereinafter, exemplary embodiments of the invention and other subject matters necessary for those skilled in the art to understand the contents of the invention will be described in detail with reference to the accompanying drawings. However, the exemplary embodiments described below are merely illustrative, regardless of their representations. That is, the invention is not limited to the exemplary embodiments described below, but may be modified into various forms. Further, in the following description, when a certain component is connected to another component, it refers to one component not only directly coupling another component but also indirectly coupling another component through an intermediate component.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

A portion of constituents that is not directly related to features of the invention may be omitted in order to clearly illustrate the invention. In addition, a portion of the constituents in the drawings may be shown in exaggerated sizes, ratios, and the like. In the drawings, the same or similar components are denoted by the same reference numerals and signs as possible although they are shown in different drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram of an exemplary embodiment of a display device.

Referring to FIG. 1, a display device according to an exemplary embodiment of the invention may include a panel unit 100 and a driver unit 200 for driving the panel unit 100.

The panel unit 100 may include at least first and second display units 120 and 130 and first and second sensor units 110 and 140. In the exemplary embodiment of FIG. 1, the display units 120 and 130 and the sensor units 110 and 140 are separately shown as individual constituents. However, the invention is not limited thereto. For example, in another exemplary embodiment, at least two of the display units 120 and 130 and the sensor units 110 and 140 may be implemented as a single unitary indivisible part.

According to an exemplary embodiment, the panel unit 100 may include a rigid display panel unit or a flexible display panel unit. When the panel unit 100 includes the rigid display panel unit, at least one of the first and second display units 120 and 130 and the first and second sensor units 110 and 140 may be embodied as a rigid display unit or a rigid sensor unit. When the panel unit 100 includes the flexible display panel unit, the first and second display units 120 and 130 and the first and second sensor units 110 and 140 may be embodied as the flexible display unit or a flexible sensor unit.

According to an exemplary embodiment, each of the first display unit 120 and the second display unit 130 may be embodied as an individual display panel, but the invention is not limited thereto. For example, in another exemplary embodiment, the first display unit 120 and the second display unit 130 may be embodied as a single foldable display panel in which the first display unit 120 and the second display unit 130 are integrally connected to each other.

According to an exemplary embodiment, the first display unit 120 and the second display unit 130 may be arranged such that surfaces thereof are in contact with each other, but the invention is not limited thereto. The first sensor unit 110 and the second sensor unit 140 may be provided on other surfaces of the first display unit 120 and the second display unit 130 rather than the contacted surfaces thereof, respectively.

That is, the first display unit 120 and the second display unit 130 may be provided to overlap with each other. The first display unit 120 and the second display unit 130 may emit light to display an image in different directions. In an exemplary embodiment, for example, the first display unit 120 may be a front display unit that emits light to a front surface of the display device and displays an image on the front surface. The second display unit 130 may be a rear display unit that emits light to a rear surface of the display device and displays an image on the rear surface.

The types of display units of the invention are not limited to the front display unit or the rear display unit. In another exemplary embodiment, for example, the first and second display units 120 and 130 may be a self-luminous display unit such as an organic light emitting display unit. In another exemplary embodiment, at least one of the first and second display units 120 and 130 may be embodied as a different type of display unit. For example, in the another exemplary embodiment, at least one of the first and second display units 120 and 130 may be a non-luminous display unit such as a liquid crystal display unit. When at least one of the first and second display units 120 and 130 is the non-luminous display unit, the display device may further include a backlight unit (not illustrated).

The first sensor unit 110 is provided on one surface of the first display unit 120. In an exemplary embodiment, the first sensor unit 110 may be provided on an image display surface of the first display unit 120, for example, the front surface. The first sensor unit 110 may include a touch sensor detecting a touch input provided on the front surface of the display device. According to an exemplary embodiment, the first sensor unit 110 may be embodied as a capacitive touch sensor, but the invention is not limited thereto.

The second sensor unit 140 is provided on one surface of the second display unit 130. In an exemplary embodiment, the second sensor unit 140 may be provided on the image display surface of the second display unit 130, for example, the rear surface. The second sensor unit 140 may include the touch sensor detecting the touch input provided on the rear surface of the display device. According to an exemplary embodiment, the second sensor unit 140 may be embodied as the capacitive touch sensor, but the invention is not limited thereto.

According to an exemplary embodiment, the first sensor unit 110 and the second sensor unit 140 may be embodied as touch sensors having substantially the same structures. In an exemplary embodiment, for example, the first sensor unit 110 may include a mutual capacitive touch sensor, and the second sensor unit 140 may include a self-capacitive touch sensor. However, the invention is not limited thereto. In another exemplary embodiment, at least one of the first sensor unit 110 and the second sensor unit 140 may be embodied as another type of touch sensor, for example, a resistive touch sensor or a touch sensor using a piezoelectric device. That is, types of the first and second sensor units 110 and 140 are not limited to particular types.

The driver unit 200 may be electrically connected to the panel unit 100 to control the panel unit 100 and transmit and receive a signal for driving the panel unit 100. According to an exemplary embodiment, the driver unit 200 may include first and second display drivers 220 and 230, first and second sensor drivers 210 and 240, and a mapping controller 250.

The first display driver 220 may be electrically connected to the first display unit 120 to control the first display unit 120. To this end, the first display driver 220 may supply a signal for driving the first display unit 120. In an exemplary embodiment, for example, the first display driver 220 may include at least one of a scan driver and a data driver for driving pixels of the first display unit 120, and a timing controller for driving the scan driver and the data driver. According to an exemplary embodiment, the scan driver, the data driver, and/or the timing controller for driving the first display unit 120 may be integrated in one display Integrated Circuit ("D-IC"), but the invention is not limited thereto. In other exemplary embodiments, at least one of the scan driver, the data driver, and the timing controller may be integrated or mounted on the first display unit 120.

The second display driver 230 may be electrically connected to the second display unit 130 to control the second display unit 130. To this end, the second display driver 230 may supply a signal for driving the second display unit 130. In an exemplary embodiment, for example, the second display driver 230 may include at least one of a scan driver, a data driver, and/or a timing controller for driving pixels of the second display unit 130. In an exemplary embodiment, the scan driver, the data driver, and/or the timing controller for driving the second display unit 130 may be integrated in one D-IC, but the invention is not limited thereto. In another exemplary embodiment, at least one of the scan driver, the data driver, and the timing controller may be integrated or mounted on the second display unit 130.

The first sensor driver 210 may be electrically connected to the first sensor unit 110 to control the first sensor unit 110. The first sensor driver 210 may transmit and receive a signal for driving the first sensor unit 110. In an exemplary embodiment, for example, the first sensor driver 210 may supply a driving signal to the first sensor unit 110 and receive a sensing signal from the first sensor unit 110. The first sensor driver 210 may detect a touch input using the sensing signal. To this end, the first sensor driver 210 may include a driving circuit and a sensing circuit. According to an exemplary embodiment, a driving circuit and a sensing circuit for driving the first sensor unit 110 may be integrated in one touch IC ("T-IC"), but the invention is not limited thereto.

The second sensor driver 240 may be electrically connected to the second sensor unit 140 to control the second sensor unit 140. The second sensor driver 240 may transmit and receive a signal for driving the second sensor unit 140. In an exemplary embodiment, for example, the second sensor driver 240 may supply a driving signal to the second sensor unit 140 and receive a sensing signal from the second sensor unit 140. The second sensor driver 240 may detect a touch input using the sensing signal. To this end, the second sensor driver 240 may include a driving circuit and a sensing circuit. According to an exemplary embodiment, the driving circuit and the sensing circuit for driving the second sensor unit 140 may be integrated in one T-IC, but the invention is not limited thereto.

The mapping controller 250 may be electrically connected to the second sensor unit 140 and the second sensor driver 240 and be activated in response to a predetermined control signal. The control signal may be input from at least one of the first and second sensor units 110 and 140, or a host processor (not shown), and the like.

The mapping controller 250 may be activated in response to the sensing signal from at least one of the first and second sensor units 110 and 140. In an exemplary embodiment, for example, the mapping controller 250 may be activated in response to the sensing signal or the event signal indicating a touch event at a predetermined position, or a sensing signal indicating detection of a predetermined content. That is, the sensing signal or the event signal indicating a touch event at a predetermined position, or the sensing signal indicating detection of the predetermined content may be used as a control signal for activating the mapping controller 250. In another exemplary embodiment, the mapping controller 250 may be activated in response to an input signal of a predetermined option key provided in the display device.

The activated mapping controller 250 may be connected to the second sensor driver 240 and receive touch input information from the sensing signal of the second sensor unit 140. The mapping controller 250 may map and convert the position information included in the received touch input information (i.e., the position information of the touch input on the second display unit 130) into a corresponding position information on the first display unit 120. To this end, the mapping controller 250 may use previously stored mapping information to map a predetermined position on the second display unit 130 into a predetermined position on the first display unit 120. In an exemplary embodiment, for example, the mapping controller 250 may refer to a memory (not shown) in which mapping information is stored to map and convert the position of the touch input, on the second display unit 130, which is detected from the second sensor unit 140 into one area on the first display unit 120 and to output the converted position information.

In an exemplary embodiment of the invention, the driver unit 200 activates the mapping controller 250 in response to the predetermined control signal and controls the first display unit 120 based on the position information output from the mapping controller 250 (i.e., the converted position information). In an exemplary embodiment, for example, the driver unit 200 may control an image or content displayed on the first display unit 120 based on the mapped position information output from the mapping controller 250.

In addition, according to an exemplary embodiment, the driver unit 200 may control the first display unit 120 based on the mapped position information output from the mapping controller 250 to display a mapped point on the screen of the first display unit 120. For example, the driver unit 200 may control the first display unit 120 to display the mapped point on the screen of the first display unit 120 based on the mapped position information output from the mapping controller 250. To this end, in an exemplary embodiment, the driver unit 200 may control the first display unit 120 to display the mapped point on the screen of the first display unit 120 in a form of a pointer, such as a cursor.

Thus, a user may touch the rear surface of the second display unit 130 of both surfaces of the display device to provide a rear surface touch input to the second sensor unit 140 and easily check the position on the first display unit 120 corresponding to the position of the rear surface touch input with the naked eye. For convenience, a mode in which the first display unit 120 on the front surface of the display device is controlled by the rear touch input through the second sensor unit 140 after the mapping controller 250 is activated is referred to as a "double sided interlocking mode." As described above, a user may easily operate a display device, such as a mobile phone, even with only one hand in the double-sided interlocking mode. Therefore, the double-sided interlocking mode improves the usability.

That is, the display device according to an exemplary embodiment of the invention may provide a touch input function and a display function on at least both surfaces, and a sensor unit and a display unit provided on different surfaces of the display device from each other, for example, the second sensor unit 140 and the first display unit 120, may be interlocked to improve the ease of use.

Figure 2:
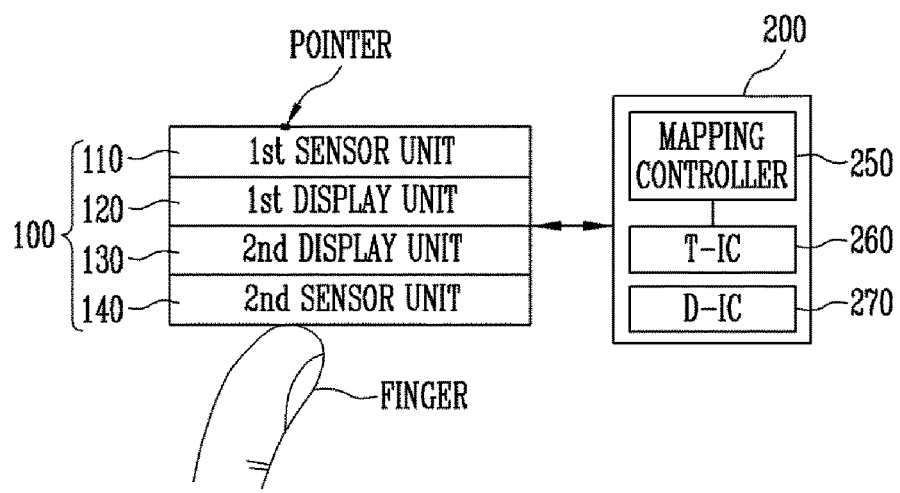
FIG. 2 illustrates a block diagram of another exemplary embodiment of a display device.
Figure 3:
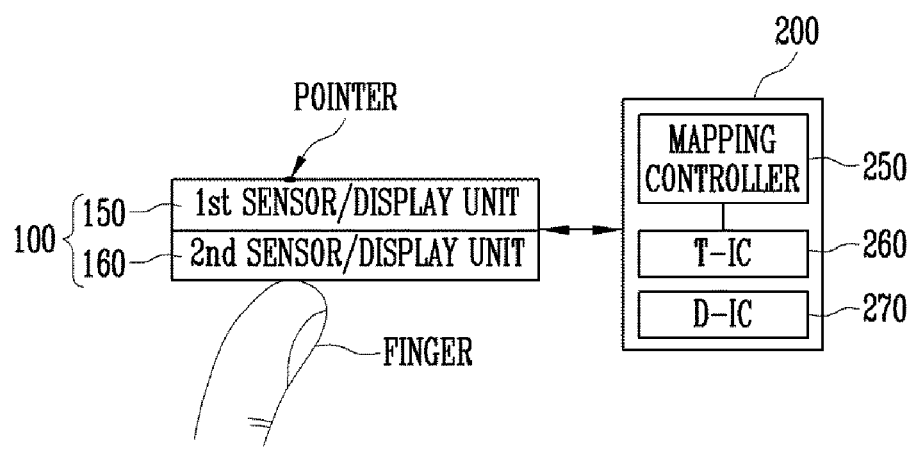
FIG. 3 illustrates a block diagram of still another exemplary embodiment of a display device.
Figure 4:
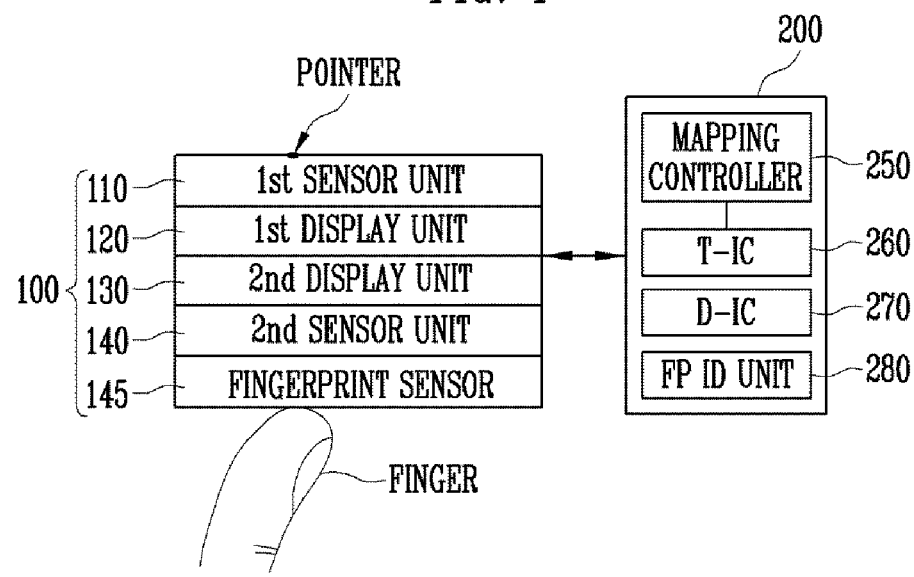
FIG. 4 illustrates a block diagram of still another exemplary embodiment of a display device.

FIGS. 2 to 4 illustrate block diagrams of other exemplary embodiments of a display device. FIGS. 2 to 4 disclose various modified embodiments of the display device according to the exemplary embodiment shown in FIG. 1. In FIGS. 2 to 4, the same or similar portions with those in FIG. 1 are denoted by the same reference numerals, and a detailed description thereof will be omitted.

Referring to FIG. 2, the first and second sensor drivers 210 and 240 for controlling and driving the first and second sensor units 110 and 140 may be integrated into a sensor driver 260. In an exemplary embodiment, for example, the first and second sensor drivers 210 and 240 may be integrated into one T-IC.

In addition, according to an exemplary embodiment of FIG. 3, the first and second display drivers 220 and 230 for controlling and driving the first and second display units 120 and 130 may be integrated into a display driver 270. In an exemplary embodiment, for example, the first and second display drivers 220 and 230 may be integrated into one D-IC.

Referring to FIG. 3, the first or second display unit 120 or 130 and the first or second sensor unit 110 or 140 corresponding to each other in the foregoing embodiment may be integrally manufactured. In an exemplary embodiment, for example, the first sensor unit 110 may be directly disposed on at least one substrate constituting the first display unit 120, or be provided in the first display unit 120. Thus, a first sensor-integrated display unit 150 may be provided.

In addition, according to an exemplary embodiment of FIG. 3, the second sensor unit 140 may be directly disposed on at least one substrate constituting the second display unit 130, or be provided in the second display unit 130. Thus, a second sensor-integrated display unit 160 may be provided.

Referring to FIG. 4, the panel unit 100 may further include a fingerprint sensor 145, and the driver unit 200 may further include a fingerprint identification unit ("FP ID UNIT") 280 identifying a touch input by using fingerprint information of a user, which is sensed in real time by the fingerprint sensor 145. In an exemplary embodiment, for example, the fingerprint sensor 145 may be provided on the rear surface of the display device by being disposed on at least one of the second display unit 130 and the second sensor unit 140 disposed on the rear surface of the display device, or by disposed in a lower cover accommodating the second display unit 130 and the second sensor unit 140 which amounts to a fingerprint sensor-integrated cover.

According to an exemplary embodiment, the fingerprint sensor 145 may be activated in response to the predetermined control signal. In an exemplary embodiment, for example, the fingerprint sensor 145 may be activated when the double-sided interlocking mode to activate the mapping controller 250 is executed to detect the fingerprint information of the user who provides the touch input on the rear surface of the display device in real time. The fingerprint identification unit 280 may compare the fingerprint information of the user detected from the fingerprint sensor 145 with predetermined fingerprint information registered in advance and identify whether the touch input provided on the rear surface of the display device is an effective touch input according to a comparison result. In an exemplary embodiment, for example, the fingerprint identification unit 280 may identify the touch input that is unintentionally generated by a palm or another finger supporting the display device when the double-sided interlocking mode is executed as an ineffective touch input so as not to react thereto, and may identify the touch input generated by the previously registered finger as the effective touch input by registering the fingerprint information of a specific finger of the user, for example, fingerprint of an index finger in advance. As described above, in an exemplary embodiment of the invention, the type of touch input generated by the second sensor unit 140 on the rear surface may be determined to identify the effective touch input. Thus, the usability when the double-sided interlocking mode is executed may be enhanced by improving the precision of touch recognition, which does not react to an undesired touch input.

Figure 5:
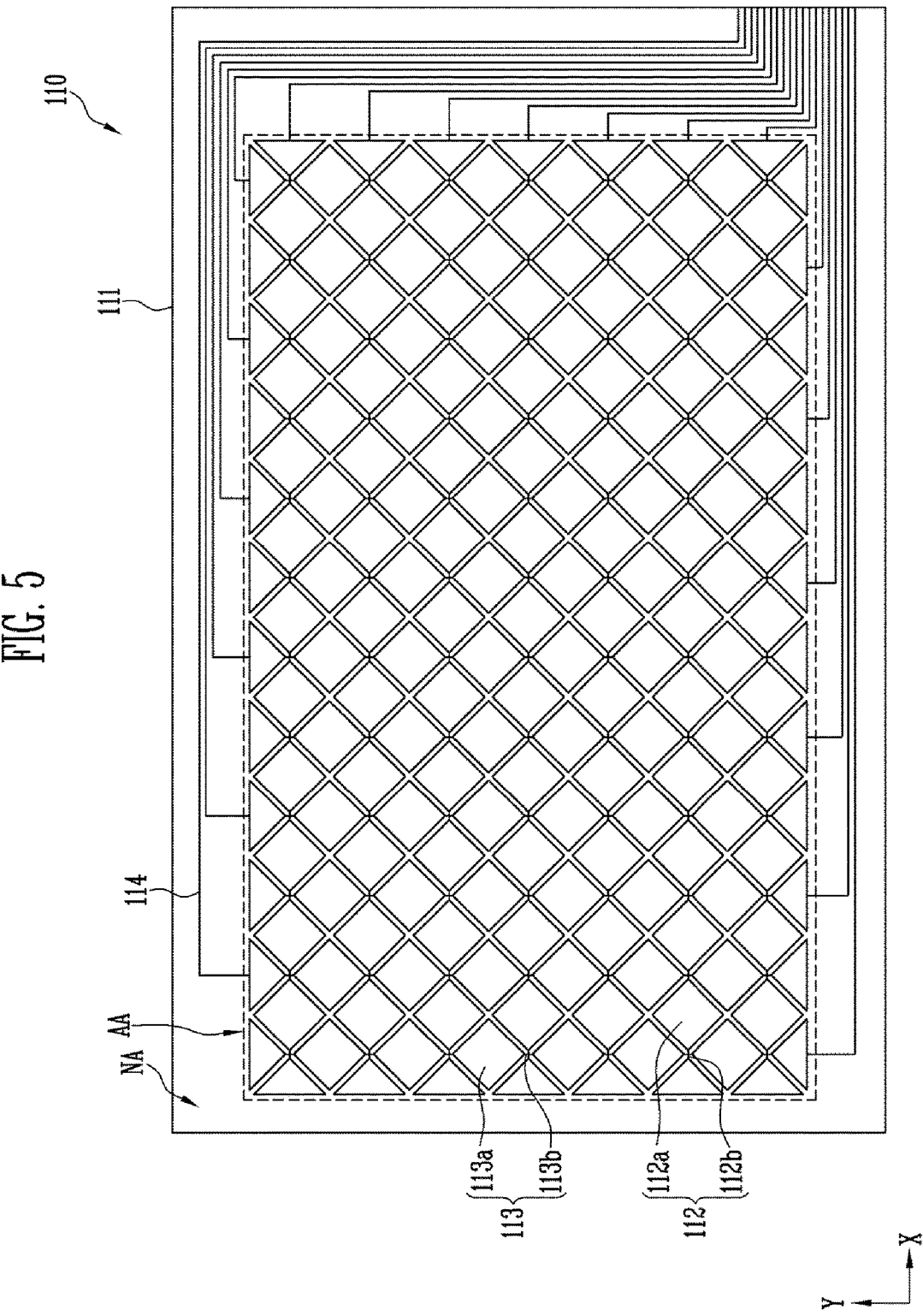
FIG. 5 illustrates an exemplary embodiment of a first sensor unit.
Figure 6:
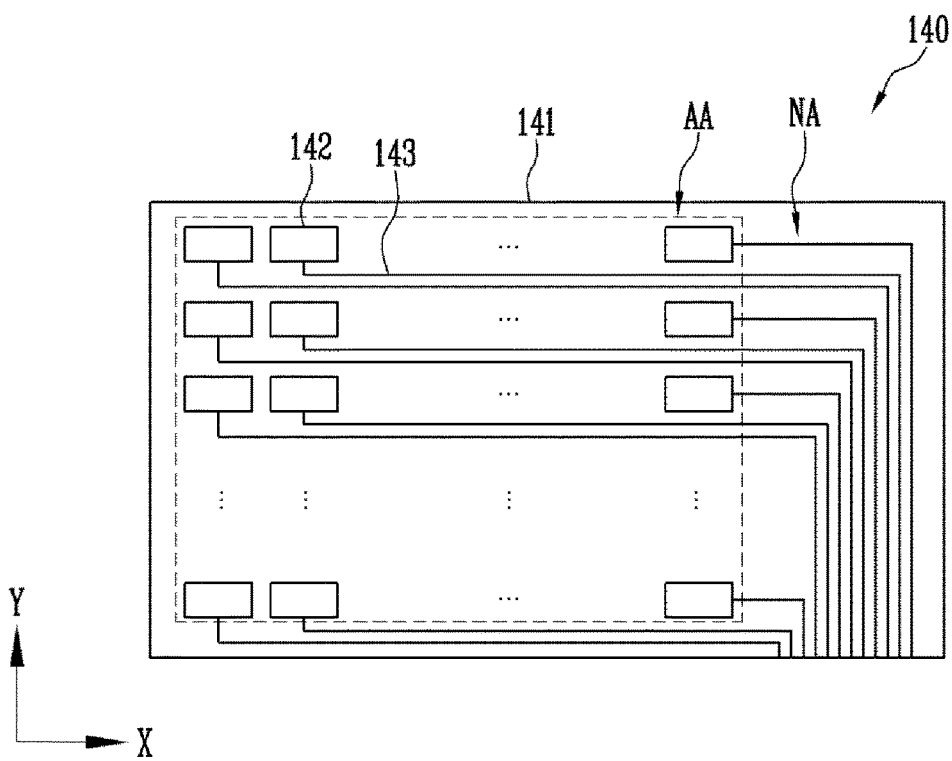
FIG. 6 illustrates an exemplary embodiment of a second sensor unit.

FIG. 5 illustrates an exemplary embodiment of a first sensor unit, and FIG. 6 illustrates an exemplary embodiment of a second sensor unit.

Referring to FIGS. 5 and 6, the first sensor unit 110 and the second sensor unit 140 may be embodied as different types of touch sensors according to an exemplary embodiment. For example, the first sensor unit 110 may be embodied as the mutual capacitive touch sensor, and the second sensor unit 140 may be embodied as the self-capacitive touch sensor.

According to an exemplary embodiment, the first sensor unit 110 may include a substrate 111 on which an active area AA and a non-active area NA are defined, a plurality of first electrodes 112 and a plurality of second electrodes 113 provided in the active area AA of the substrate 111, and a plurality of wires 114 provided in the inactive area NA of the substrate 111 and electrically connected to the first electrodes 112 and the second electrodes 113.

Each of the first electrodes 112 may include a plurality of first sensing cells 112a arranged in a first direction (e.g., an X direction) and a plurality of first connection units 112b electrically connecting the plurality of first sensing cells 112a along the first direction. Alternatively, in another exemplary embodiment, each first electrode 112 may be a bar-shaped electrode extending along the first direction, for example.

Each of the second electrodes 113 may include a plurality of second sensing cells 113a arranged in a second direction (e.g., a Y direction) which intersects the first direction and a plurality of second connection units 113b electrically connecting the plurality of second sensing cells 113a along the second direction. Alternatively, in another exemplary embodiment, each second electrode 113 may be the bar-shaped electrode extending along the second direction.

According to an exemplary embodiment, the second electrodes 113 may be sensing electrodes for outputting the sensing signal, and the first electrodes 112 may be driving electrodes for receiving the driving signal corresponding to the sensing signal. Alternatively, the first electrodes 112 may be the sensing electrodes, and the second electrodes 113 may be the driving electrodes.

According to an exemplary embodiment of FIG. 6, the second sensor unit 140 may include a substrate 141 on which an active area AA and a non-active area NA are defined, a plurality of electrodes 142 provided in the active area AA of the substrate 141 and a plurality of wires 143 electrically connected to the electrodes 142, respectively, and drawn out to the non-active area NA.

The plurality of electrodes 142 may be dispersed in the active area AA and arranged along the first direction (e.g., the X direction) and the second direction (e.g., the Y direction). That is, each of the electrodes 142 may be provided on a predetermined position that is defined by coordinates. Therefore, the touch input at the corresponding position may be sensed by the sensing signal input from each of the electrodes 142.

In the exemplary embodiment of FIGS. 5 and 6 as described above, the first sensor unit 110 disposed on the front surface and the second sensor unit 140 disposed on the rear surface may be embodied as the mutual capacitive touch sensor and the self-capacitive touch sensor, respectively. The mutual capacitive touch sensor may reduce the non-active area NA compared to the self-capacitive touch sensor. Therefore, the mutual capacitive touch sensor may be suitable to a narrow bezel which is advantageous for providing a wide screen. In addition, the mutual capacitive touch sensor may have a high sensitivity to a touch input tool such as an active pen.

The self-capacitive touch sensor may be suitable to control on/off states of the touch function by each area. In an exemplary embodiment, for example, if the self-capacitive touch sensor is used, it is easy to turn off the touch sensors on a portion of an area which is likely to be contacted by a finger or a palm other than the previously registered finger (e.g., an index finger) when the double-sided interlocking mode is executed. In another exemplary embodiment, for example, when the double-sided interlocking mode is executed, a touch function of only a partial area located at the center, among the active areas AA of the second sensor unit 140, may be selectively turned on and a touch function of the remaining edge area of the second sensor unit 140 may be selectively turned off, thereby preventing malfunction caused by the unintended touch input.

However, the invention is not limited to the exemplary embodiments described in FIGS. 5 and 6. For example, in another exemplary embodiment, the first and second sensor units 110 and 140 may use the same structure or type of touch sensors.

Figure 7:
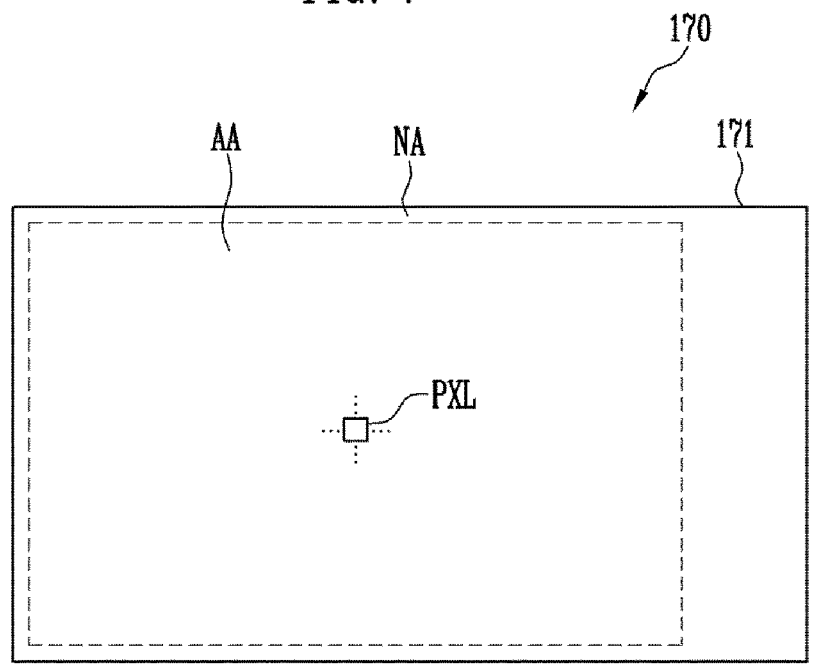
FIG. 7 illustrates a schematic plan view of an exemplary embodiment of a display unit of a display device.
Figure 8:
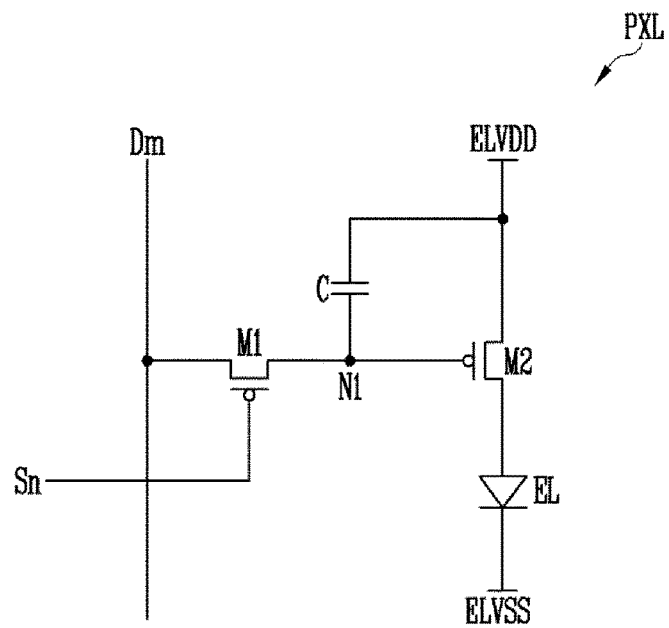
FIG. 8 illustrates a circuit diagram of an exemplary embodiment of a pixel of the display unit shown in FIG. 7.
Figure 9:
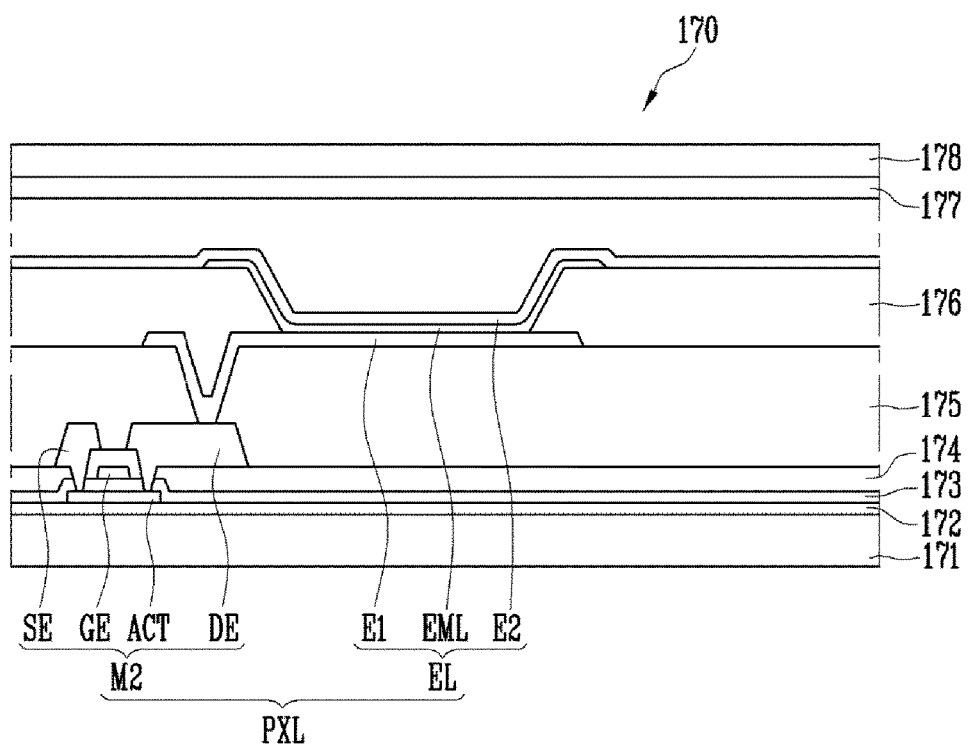
FIG. 9 illustrates a cross-sectional view of an exemplary embodiment of one area of the pixel shown in FIG. 8.

FIGS. 7 to 9 illustrate a display unit according to an exemplary embodiment of the invention. Specifically, FIG. 7 is a schematic plan view of an exemplary embodiment of a display unit of a display device, and FIG. 8 is a circuit diagram of an exemplary embodiment of a pixel that may be applied to the display unit shown in FIG. 7. For convenience, FIG. 8 shows a pixel, of an active organic light emitting display unit, which is connected to an n-th (n is a natural number) scan line and an m-th (m is a natural number) data line and includes two transistors. However, the pixel of the display unit according to the invention is not limited thereto, and the type and structure of the pixel may be variously changed. FIG. 9 is a cross-sectional view of an exemplary embodiment of one area of the pixel shown in FIG. 8.

Referring to FIG. 7, the display unit 170 may include a substrate 171 in which an active area AA and a non-active area NA are defined, and a plurality of pixels PXL provided in the active area AA of the substrate 171.

Referring to FIG. 8, each of the pixels PXL may include first and second transistors M1 and M2, a capacitor C, and a light emitting device EL.

The first transistor M1 may be connected between a data line Dm and a first node N1, and a gate electrode of the first transistor M1 may be connected to a scan line Sn. The first transistor M1 may be turned on when a scan signal having a gate-on voltage (e.g., a low voltage) is supplied from the scan line Sn. When the first transistor M1 is turned on, the data line Dm and the first node N1 may be electrically connected.

The second transistor M2 may be connected between a first power source ELVDD and the light emitting device EL, and a gate electrode of the second transistor M2 may be connected to the first node N1. The second transistor M2 may control a driving current which flows from the first power source ELVDD to a second power source ELVSS via the light emitting device EL based on a voltage of the first node N1. According to an exemplary embodiment, the first power source ELVDD may be a high potential pixel power source and the second power source ELVSS may be a low potential pixel power source.

The capacitor C may be connected between the first power source ELVDD and the first node N1. The capacitor C may store a voltage corresponding to a data signal supplied to the first node N1 and maintain the stored voltage until the data signal of a subsequent frame is supplied.

The light emitting device EL may be connected between the second transistor M2 and the second power source ELVSS. The light emitting device EL may emit light at luminance based on the driving current controlled by the second transistor M2. According to an exemplary embodiment, the light emitting device EL may be an organic light emitting diode ("OLED"), but the invention is not limited thereto.

Referring to FIG. 9, a display unit 170 may include the first substrate 171 and a second substrate 177 opposite to each other, and the pixel PXL provided between the first substrate 171 and the second substrate 177.

According to an exemplary embodiment, at least one of the first substrate 171 and the second substrate 177 may be a rigid substrate or a flexible substrate, and the material thereof is not limited to particular materials. In addition, according to an exemplary embodiment, at least one of the first substrate 171 and the second substrate 177 may be replaced with a thin organic/inorganic film. In an exemplary embodiment, for example, the second substrate 177 may be embodied as an insulating layer including at least one of organic and inorganic films. In an exemplary embodiment, the second substrate 177 may be a thin film encapsulation ("TFE") layer including at least one of the organic and inorganic films.

According to an exemplary embodiment, a sensor layer 178 may be disposed on one surface of at least one of the first substrate 171 and the second substrate 177. For example, the sensor layer 178, which is integrally provided with the display unit 170, may be provided on the second substrate 177. According to an exemplary embodiment, the sensor layer 178 may constitute the first sensor unit 110 or the second sensor unit 140 described above. However, the invention is not limited thereto. For example, in another exemplary embodiment, the first sensor unit 110 or the second sensor unit 140 may be separately manufactured from the first display unit 120 or the second display unit 130 and be provided on one surface thereof. In addition, according to an exemplary embodiment, a predetermined functional layer (not illustrated), such as a polarizing layer or a reflective layer, may be further provided on one surface of at least one of the first substrate 171 and the second substrate 177.

According to an exemplary embodiment, the pixel PXL may include a transistor provided on a first surface, of the first substrate 171, which is toward the second substrate 177, for example, the second transistor M2 of FIG. 8, and the light emitting device EL electrically connected to the second transistor M2. According to an exemplary embodiment, a buffer layer 172 may be provided between the first substrate 171 and the pixel PXL.

According to an exemplary embodiment, the second transistor M2 may include an active layer ACT, a gate electrode GE, and source and drain electrodes SE and DE. According to an exemplary embodiment, the active layer ACT may be provided on the buffer layer 172 which is disposed on one surface of the first substrate 171, and the gate electrode GE may be provided to overlap the active layer ACT and a first insulating layer 173 which is interposed therebetween. According to an exemplary embodiment, the source and drain electrodes SE and DE may be positioned on a second insulating layer 174 disposed on the gate electrode GE and be connected to the active layer ACT through a contact hole penetrating to the first and second insulating layers 173 and 174. However, the structure of the second transistor M2 is not limited thereto, but may be variously changed.

According to an exemplary embodiment, a third insulating layer 175 may be disposed on the source and drain electrodes SE and DE, and the light emitting device EL may be provided on the third insulating layer 175. The light emitting device EL may be electrically connected to the second transistor M2 through a via hole defined in the third insulating layer 175.

The light emitting device EL may include a first electrode E1 and a second electrode E2 overlapping each other in at least one area and a light emitting layer EML interposed between the first and second electrodes E1 and E2. According to an exemplary embodiment, the first electrode E1 and the second electrode E2 may be an anode electrode and a cathode electrode, respectively, but the invention is not limited thereto. In another exemplary embodiment, for example, the first electrode E1 electrically connected to the second transistor M2 may be the cathode electrode. In an exemplary embodiment, one area of the anode electrode, for example, an edge area, may be covered by a pixel defining layer 176, and the light emitting layer EML may be provided in an exposed area that is not covered by the pixel defining layer 176.

The display unit 170 according to the exemplary embodiment described above may be applied to at least one of the first and second display units 120 and 130 described above. For example, in an exemplary embodiment of the invention, the first and second display units 120 and 130 may be embodied as the display unit 170 according to the exemplary embodiment shown in FIG. 9.

However, the invention is not limited thereto. For example, in another exemplary embodiment, the first and second display units 120 and 130 may have different structures from each other. For example, the second display unit 130 may include a different type of display unit from the first display unit 120, or may include the same type of display unit as the first display unit 120 and have a partially different structure from the first display unit 120.

Figure 10:
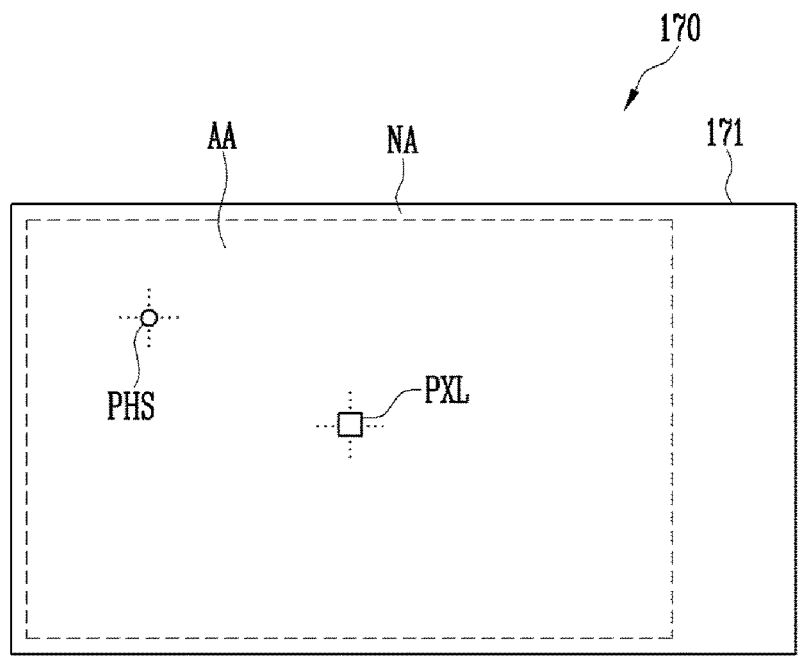
FIG. 10 illustrates a schematic plan view of another exemplary embodiment of a display unit of a display device.
Figure 11:
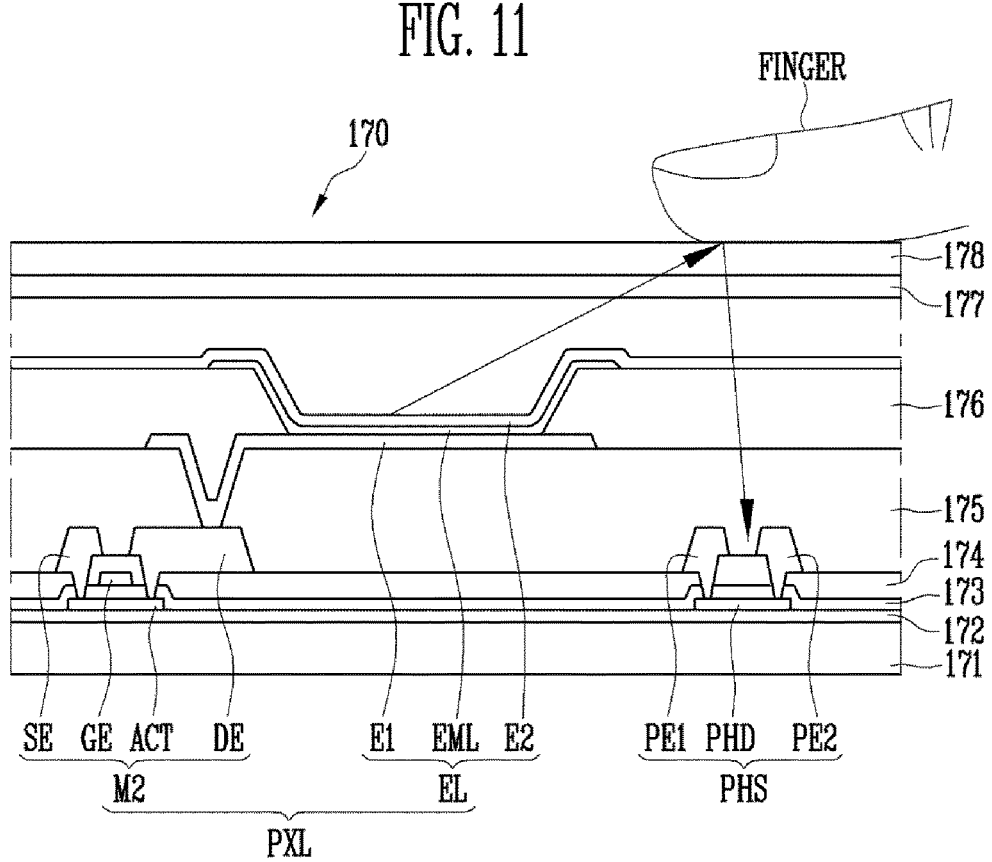
FIG. 11 illustrates a cross-sectional view of an exemplary embodiment of a display unit of FIG. 10.
Figure 12:
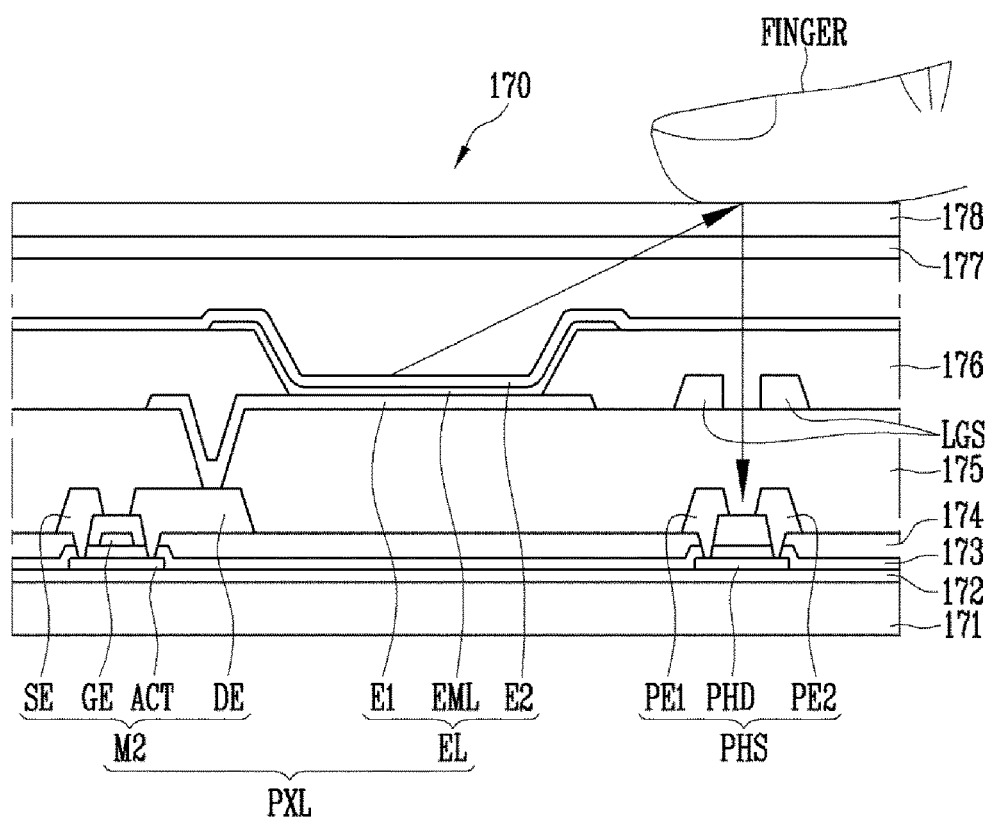
FIG. 12 illustrates a display unit according to an embodiment of the present disclosure.

FIGS. 10 to 12 illustrate the display unit according to an exemplary embodiment of the invention. In FIGS. 10 to 12, the same or similar constituents with those in FIGS. 7 to 9 are denoted by the same reference numerals, and a detailed description thereof will be omitted.

Referring to FIG. 10, the display unit 170 according to an exemplary embodiment of the invention may include a plurality of photo sensors PHS provided in the active area AA. In an exemplary embodiment, for example, the photo sensors PHS may be uniformly dispersed in the active area AA with a predetermined resolution. According to an exemplary embodiment, the photo sensors PHS may be arranged in an area between the pixels PXL, but the invention is not limited thereto. The display unit 170 according to an exemplary embodiment of the invention may identify the fingerprint of a user by using the photo sensors PHS dispersed in the active area AA.

Referring to FIGS. 10 and 11, the display unit 170 according to an exemplary embodiment of the invention may have a fingerprint sensor including the photo sensors PHS. For example, the display unit 170 may include a plurality of the photo sensors PHS arranged on the same layer as the second transistors M2 included in the pixels PXL.

According to an exemplary embodiment, each of the photo sensors PHS may include a photo diode PHD provided on the same layer as the active layer ACT of the second transistors M2, and first and second photo electrodes PE1 and PE2 connected to both ends of the photo diode PHD. The photo sensor PHS may be electrically connected to a fingerprint sensing circuit (not shown) through the first and second photo electrodes PE1 and PE2 and output optical information incident on the photo diode PHD to the fingerprint sensing circuit. In an exemplary embodiment, for example, when a user touches the display unit 170 with a finger, part of the light emitted from the light emitting device EL electrically connected to the pixel PXL may be reflected by the finger or fingerprint to be incident on the photo sensor PHS. The photo sensor PHS may output a sensing signal corresponding to the amount of incident light.

According to an exemplary embodiment, the optical information sensed by the photo sensors PHS may be input to the fingerprint identification unit 280 provided in the driver unit 200. The fingerprint identification unit 280 may generate the fingerprint information of a whole finger of a user by gathering the optical information transmitted from the plurality of photo sensors PHS.

Referring to FIG. 12, according to an exemplary embodiment, the display unit 170 may further include a light guide structure LGS for selectively transmitting only the light in a predetermined direction, which is previously set, of the reflected light reflected from the finger or fingerprint of the user. For example, the display unit 170 may further include the light guiding structure LGS for selectively transmitting only the light vertically incident on the photo sensor PHS, of the reflected light reflected from the finger or fingerprint of the user.

In the display device according to an exemplary embodiment of the invention, the structure and the type of the fingerprint sensor are not limited to the photo sensors PHS of the exemplary embodiment shown in FIGS. 10 to 12. That is, according to an exemplary embodiment, the fingerprint of the user may be detected by using fingerprint sensors of various structures or types.

The display unit 170 according to an exemplary embodiment described with reference to FIGS. 10 to 12 may be applied to at least one of the first and second display units 120 and 130 described above. For example, in an exemplary embodiment of the invention, the second display unit 130 disposed on the rear surface of the display device may be embodied as a display unit having the fingerprint sensor. In particular, the second display unit 130 may include the plurality of photo sensors PHS provided in the active area AA as shown in FIGS. 10 to 12, so that the fingerprint of the user may be detected or identified, for example.

As described above, when the fingerprint sensor is provided on the rear surface of the panel unit 100, for example, the effective touch input may be distinguished from the ineffective touch input when the double-sided interlocking mode is executed, so that the accuracy of touch recognition may be improved. In an exemplary embodiment, for example, when a user touches the display device with another finger or a palm rather than the registered finger (e.g., the left hand index finger and/or the right hand index finger of the user) without intention, the touch input may be determined to be the ineffective touch input, and images and contents displayed on the front surface may not be controlled by the ineffective touch input, so that the usability may be improved.

Figure 13:
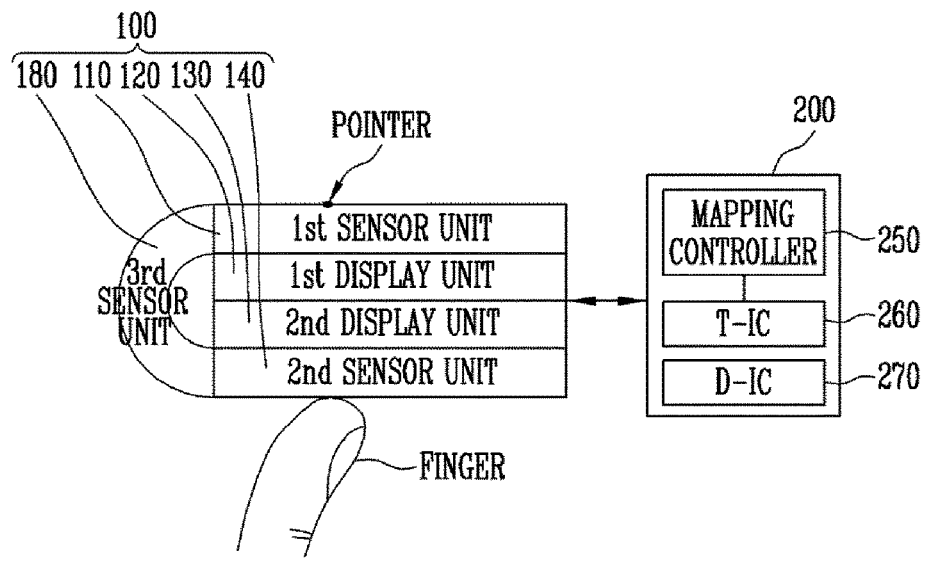
FIG. 13 illustrates a block diagram of an exemplary embodiment of a display device.

FIG. 13 illustrates a block diagram of an exemplary embodiment of a display device. In FIG. 13, the same or similar constituents as those of the above-described exemplary embodiment are denoted by the same reference numerals, and a detailed description thereof will be omitted.

Referring to FIG. 13, in the display device according to an exemplary embodiment of the invention, the panel unit 100 may include the first and second display units 120 and 130, the first sensor unit 110 and the second sensor unit 140 provided on respective surfaces of the first sensor units 120 and 130, and a third sensor unit 180 provided between the first sensor unit 110 and the second sensor unit 140. That is, the third sensor unit 180 may be provided on the same side of the first and second display units 120 and 130.

In addition, in the display device according to an exemplary embodiment of the invention, the driver unit 200 may include the sensor driver 260 for controlling the first, second, and third sensor units 110, 140, and 180, the display driver 270 for controlling the first and second display units 120 and 130, and the mapping controller 250 for mapping the position of the touch input detected from the sensing signal of the second sensor unit 140 into one area of the first display unit 120 of the front surface to execute the double-sided interlocking mode.

That is, the display device according to an exemplary embodiment of the invention may further include the third sensor unit 180 provided between the first sensor unit 110 and the second sensor unit 140. For example, the third sensor unit 180 may be provided on at least one surface of the display device to sense the touch input provided on a side surface of the display device. In an exemplary embodiment, for example, the first and second sensor units 110 and 140 may be disposed on outer surfaces of the first and second display units 120 and 130, respectively, the first and second display units 120 and 130 may be interposed therebetween, and the third sensor unit 180 may be connected between the first and second sensor units 110 and 140 and be disposed on the same side surfaces of the first and second sensor units 110 and 140.

According to an exemplary embodiment, the third sensor unit 180 may be manufactured integrally with the first sensor unit 110 and/or the second sensor unit 140, or separately from the first sensor unit 110 and the sensor unit 140 to be connected therebetween.

According to an exemplary embodiment, the third sensor unit 180 may be embodied as a curved sensor unit of a fixed form with a predetermined curvature between the first sensor unit 110 and the second sensor unit 140, but the invention is not limited thereto. For example, in another exemplary embodiment, the third sensor unit 180 may be embodied as a flexible sensor unit. For example, the display device may be a foldable display device that is foldable in the area where the third sensor unit 180 is disposed.

According to an exemplary embodiment, the third sensor unit 180 may include at least a touch sensor to sense the touch input provided on the side surface of the display device. For example, the third sensor unit 180 may include the touch sensor of the same type as the first sensor unit 110 and/or the second sensor unit 140. However, the invention is not limited thereto. For example, in another exemplary embodiment, the third sensor unit 180 may include a pressure sensing device including an option key or the like for identifying a designated position or an event.

The display device according to the exemplary embodiment of FIG. 13 may additionally include the third sensor unit 180, so that various additional functions may be performed by detecting a touch input provided on the side surface of the display device. In an exemplary embodiment, for example, the mapping controller 250 may be activated based on a sensing signal sensed by the third sensor unit 180. That is, the control signal for controlling on/off states of the mapping controller 250 may be generated based on the touch input provided to the third sensor unit 180.

In the case that a user uses the display device with one hand when the double-sided interlocking mode to activate the mapping controller 250 is executed, an undesired touch input may be provided to the side surface of the display device. Therefore, for the above case, in an exemplary embodiment, the sensor driver 260 may temporarily turn off a touch function of the third sensor unit 180 when the double-sided interlocking mode to maintain an activation state is executed after the mapping controller 250 is activated. When a predetermined control signal instructing the termination of the double-sided interlocking mode or a predetermined control signal instructing to activate the third sensor unit 180 is input, the sensor driver 260 may turn on the touch function of the third sensor unit 180.

In addition, according to an exemplary embodiment, the sensor driver 260 may activate only a partial area of the second sensor unit 140 and turn off a touch function of the remaining area of the second sensor unit 140 when the double-sided interlocking mode to activate the mapping controller 250 is executed. That is, according to an exemplary embodiment, the sensor driver 260 may activate the touch function only for the partial area of the second sensor unit 140 when the double-sided interlocking mode is executed. Accordingly, a touch function may be selectively inactivated in a partial area in which an unintended touch input is likely to be generated, and such a limitation on an area where the touch function is activated may prevent malfunction caused by the unintended touch input and improve usability.

Further, in an exemplary embodiment of the invention, the display device may separate or classify the touch input provided to the first, second and/or third sensor units 110, 140, and/or 180 into a plurality of touch events and perform a predetermined operation based on the touch events. In an exemplary embodiment, for example, the display device may control the on/off states of at least one of the first and second display units 120 and 130 and the first, second, and third sensor units 110, 140, and 180 based on each touch event.

According to an exemplary embodiment, such a control operation may be performed in the driver unit 200. For example, the driver unit 200 may analyze the touch input provided to the third sensor unit 180 to identify the effective touch event among the plurality of touch events, and perform a predetermined operation based on the identified effective touch event.

According to an exemplary embodiment, the driver unit 200 may count the number of touch inputs sequentially provided to the first, second and/or third sensor units 110, 140, and/or 180 and perform a predetermined operation corresponding to a count such that the driver unit 200 may distinguish the plurality of touch events by the number of sequential touch inputs within a predetermined time. For example, the driver unit 200 may count touch inputs sequentially provided to the third sensor unit 180 and perform a predetermined operation based on a count. In an exemplary embodiment, for example, the driver unit 200 may turn on the first sensor unit 110 and/or the first display unit 120 in an activated state when a user touches the third sensor unit 180 twice in succession, turn on the second sensor unit 140 and/or the second display unit 130 in an activated state when the user touches the third sensor unit 180 three times in succession, and turn on the first, second, and third sensor units 110, 140, and 180 in an activated state when the user touches the third sensor unit 180 four times in succession. However, the above feature is to be merely understood as an example, and a predetermined touch event and a predetermined operation corresponding thereto may be variously set.

According to an exemplary embodiment of the invention described above, the third sensor unit 180 may be additionally provided on the side surface of the display device, thereby providing various additional functions.

Figure 14:
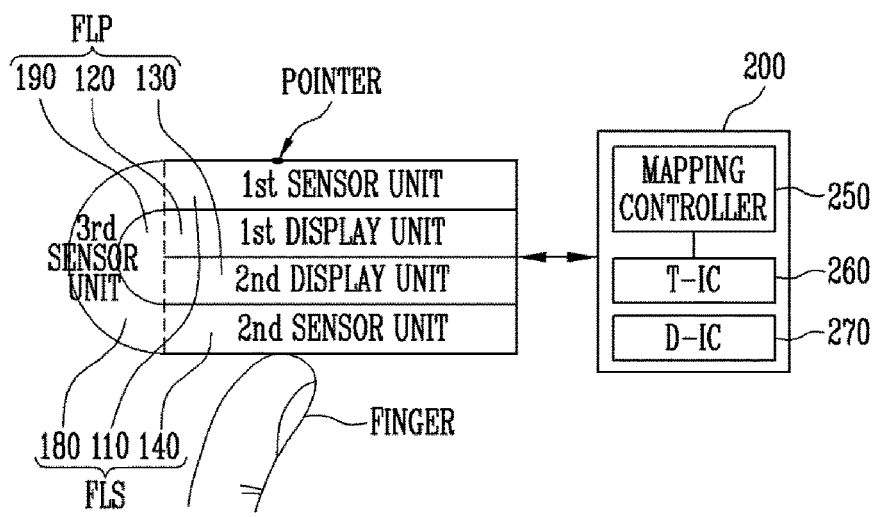
FIG. 14 illustrates a block diagram of another exemplary embodiment of a display device.

FIG. 14 illustrates a block diagram of another exemplary embodiment of a display device. In FIG. 14, the same or similar constituents as those of the above-described exemplary embodiments are denoted by the same reference numerals, and a detailed description thereof will be omitted.

Referring to FIG. 14, the display device according to an exemplary embodiment of the invention may be a foldable display device. According to an exemplary embodiment, the first and second display units 120 and 130 may be integrally connected to provide a single foldable display panel FLP. For example, the display device according to an exemplary embodiment of the invention may be folded along a predetermined folding axis so that surfaces of the first and second display units 120 and 130 may be in contact with each other. For example, in the foldable display device according to an exemplary embodiment of the invention, the third sensor unit 180 may be provided in a folding area, and the display device may be folded along the predetermined folding axis provided in the third sensor unit 180.

The foldable display panel FLP may display an image on at least both surfaces thereof, which is outside the folding area. Further, according to an exemplary embodiment, if the pixels are continuously arranged in a folding area 190 of the foldable display panel FLP (e.g., a connecting area between the first display unit 120 and the second display unit 130), the foldable display panel FLP may display a predetermined image in the folding area 190 and display the image on the side surface thereof.

According to an exemplary embodiment, the first, second, and third sensor units 110, 140, and 180 may be integrally connected to be included in a foldable sensor unit FLS. According to an exemplary embodiment, the foldable sensor unit FLS may be provided on one surface of the foldable display panel FLP. The foldable sensor unit FLS may be integrally provided with the foldable display panel FLP or separately provided from the foldable display panel FLP to be disposed on one surface thereof.

The foldable display device according to the exemplary embodiment of FIG. 14 may include the mapping controller 250 in the same manner as the display device according to the above-described exemplary embodiments and operate in the double-sided interlocking mode due to the mapping controller 250. In an exemplary embodiment, for example, the mapping controller 250 may map corresponding points of the first display unit 120 and the second display unit 130 based on the position of the first display unit 120 and the second display unit 130 when the foldable display panel FLP is folded, so that the first display unit 120 on the front surface may be controlled based on the corresponding touch input provided through the second sensor unit 140 of the rear surface. When the foldable display device is unfolded, the first and second display units 120 and 130 may be connected to provide an expanded screen.

FIGS. 15 to 20 illustrate a foldable sensor unit according to an embodiment of the invention.

Figure 15:
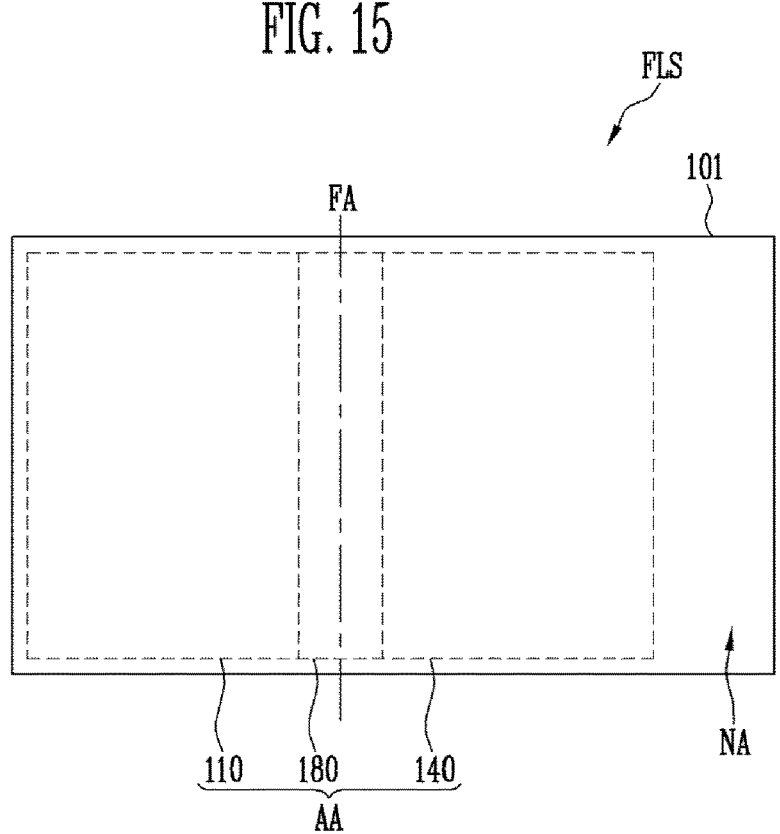
FIG. 15 illustrates a schematic plan view of an exemplary embodiment of a foldable sensor unit.

Referring to FIG. 15, the foldable sensor unit FLS according to an embodiment of the invention may include a substrate 101 on which an active area AA and a non-active area NA are defined, and the first, second, and third sensor units 110, 140, and 180 provided in the active area AA of the substrate 101. In the exemplary embodiment of FIG. 15, a folding axis FA may be disposed to cross the center of the active area AA. However, the position of the folding axis FA may be different.

Figure 16:
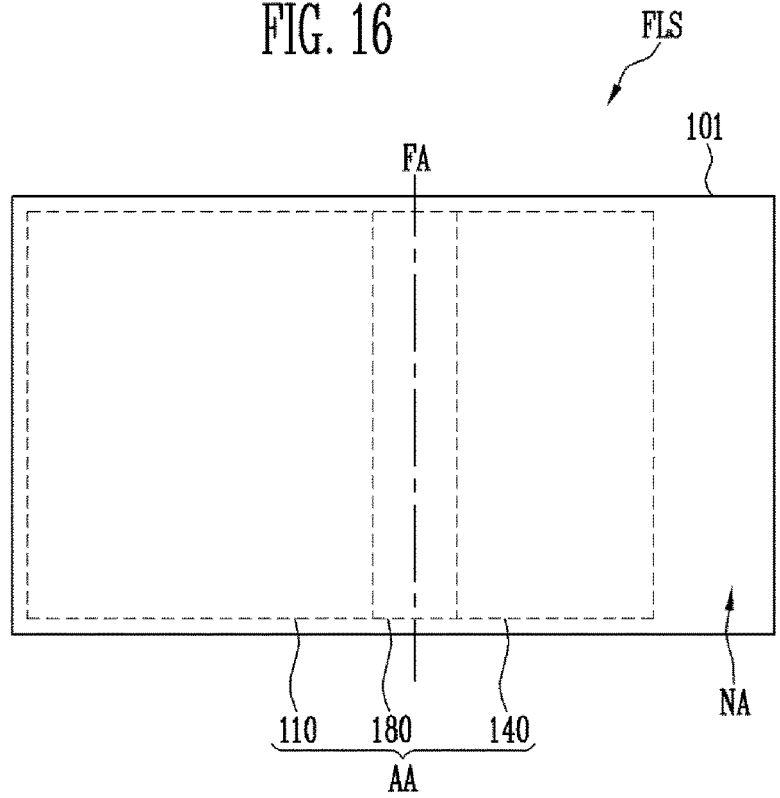
FIG. 16 illustrates a schematic plan view of another exemplary embodiment of a foldable sensor unit.

For example, in another exemplary embodiment as shown in FIG. 16, the folding axis FA may be disposed to cross the center of the substrate 101 rather than the center of the active area AA. That is, the position of the folding axis FA may be various. In addition, in an exemplary embodiment, the position of the folding axis FA may be fixed, and in another exemplary embodiment, the position of the folding axis FA may be variable.

In an exemplary embodiment of the invention, the first, second, and third sensor units 110, 140, and 180 included in the foldable sensor unit FLS may be integrally connected. In an exemplary embodiment, for example, electrodes included in the first, second, and third sensor units 110, 140, and 180 may be sequentially disposed in the active area AA. In another exemplary embodiment, for example, respective electrodes (e.g., sensing electrodes) of the first, second, and third sensor units 110, 140, and 180 disposed in the same row or the same column of the active area AA may be integrally connected and be included in a sensing channel.

Figure 17:
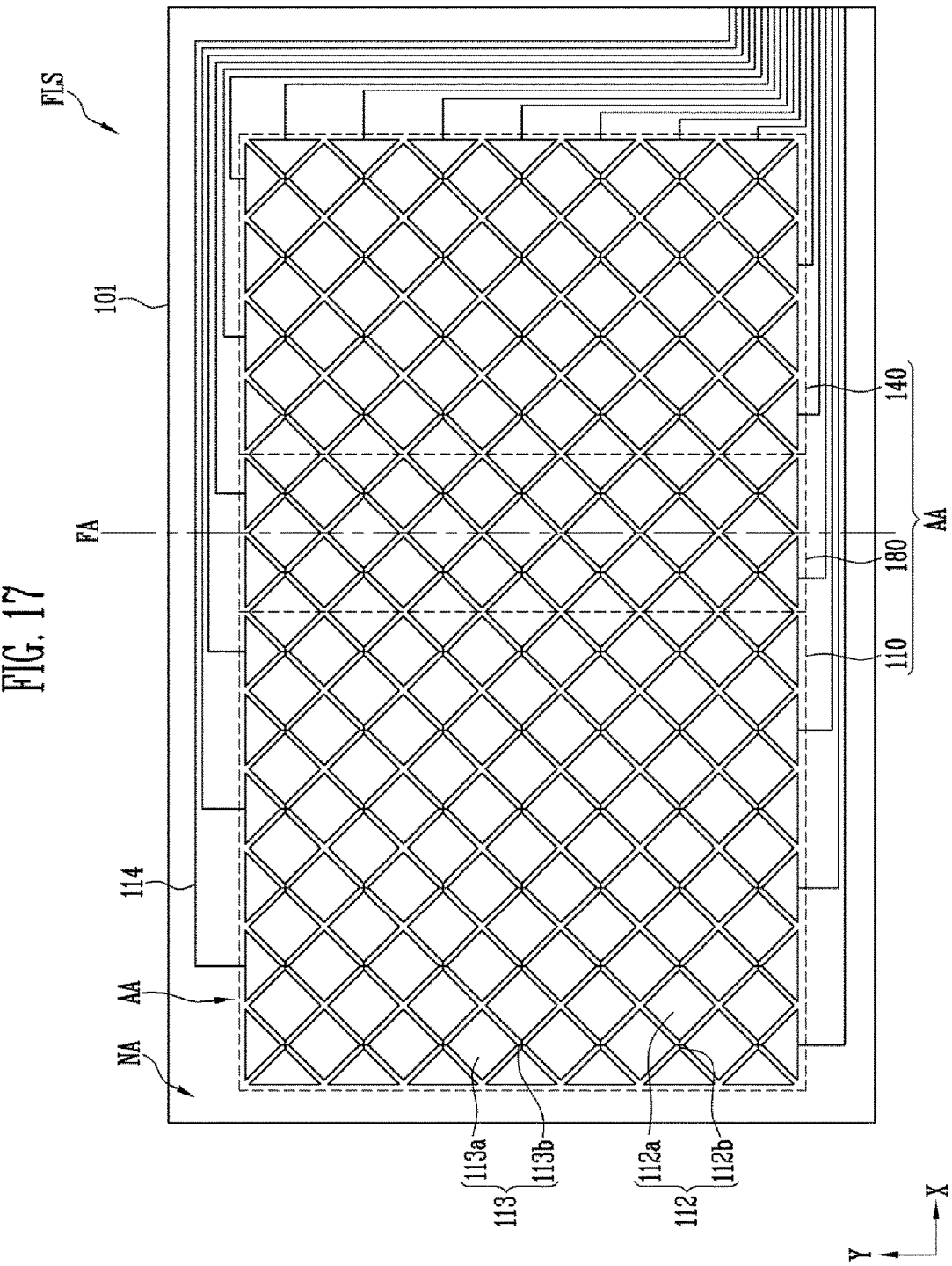
FIG. 17 illustrates an exemplary embodiment of a foldable sensor unit.
Figure 18:
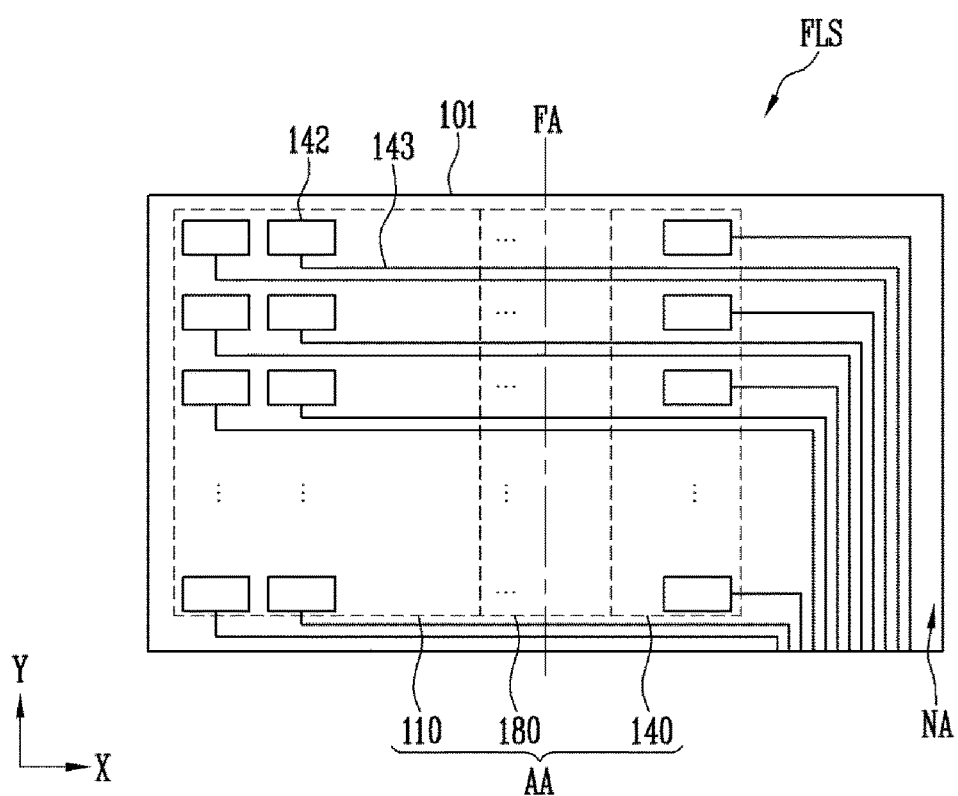
FIG. 18 illustrates another exemplary embodiment of a foldable sensor unit.

For example, in an exemplary embodiment as shown in FIGS. 17 and 18, the first, second, and third sensor units 110, 140, and 180 may be sequentially disposed in the active area AA. In an exemplary embodiment, for example, the first, second, and third sensor units 110, 140, and 180 may be embodied as the mutual capacitive touch sensor as shown in FIG. 17, and the first and second electrodes 112 and 113 may be integrally connected without any distinction between the first, second, and third sensor units 110, 140, and 180. In another exemplary embodiment as shown in FIG. 18, the first, second, and third sensor units 110, 140, and 180 may be embodied as a self-capacitive touch sensor, and the electrodes 142 may be uniformly dispersed in the active area AA without any distinction between the first, second, and third sensor units 110, 140, and 180.

Figure 19:
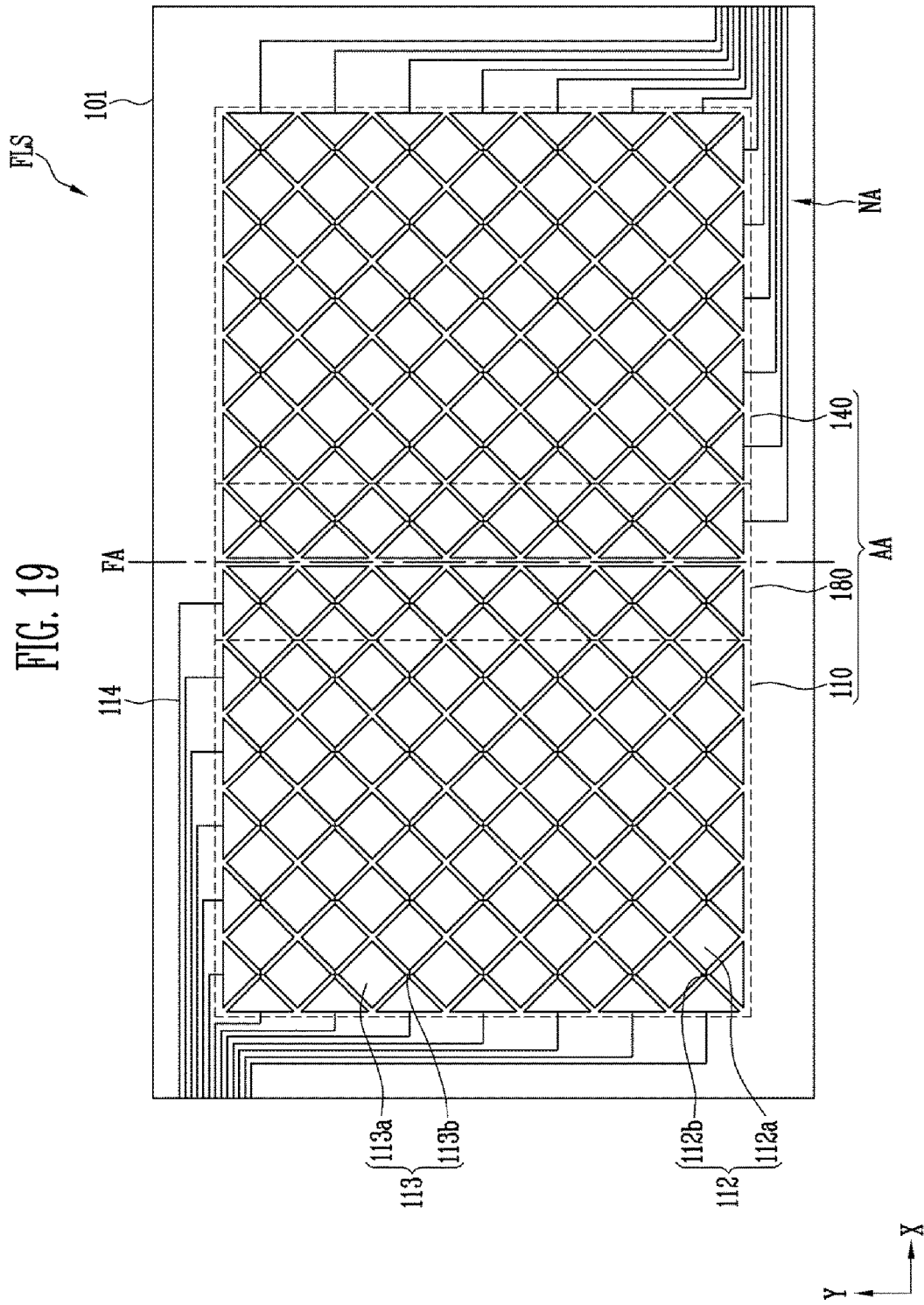
FIG. 19 illustrates still another exemplary embodiment of a foldable sensor unit.

In addition, in another exemplary embodiment of the invention, the electrodes included in the first, second, and third sensor units 110, 140, and 180 of the foldable display device may be arranged in the active area AA in a discontinuous manner. For example, in an exemplary embodiment as shown in FIG. 19, at least one of the first and second electrodes 112 and 113, particularly at least one electrode provided in an area where the folding axis FA is disposed, may be divided on the basis of the folding axis FA. In addition, in another exemplary embodiment, at least one of the first and second electrodes 112 and 113 may be divided at boundaries of the areas between the first, second, and third sensor units 110, 140, and 180. For example, the first and second electrodes 112 and 113 may be divided at the boundaries between the first, second, and third sensor units 110, 140, and 180 to independently drive the first, second, and third sensor units 110, 140, and 180.

Figure 20:
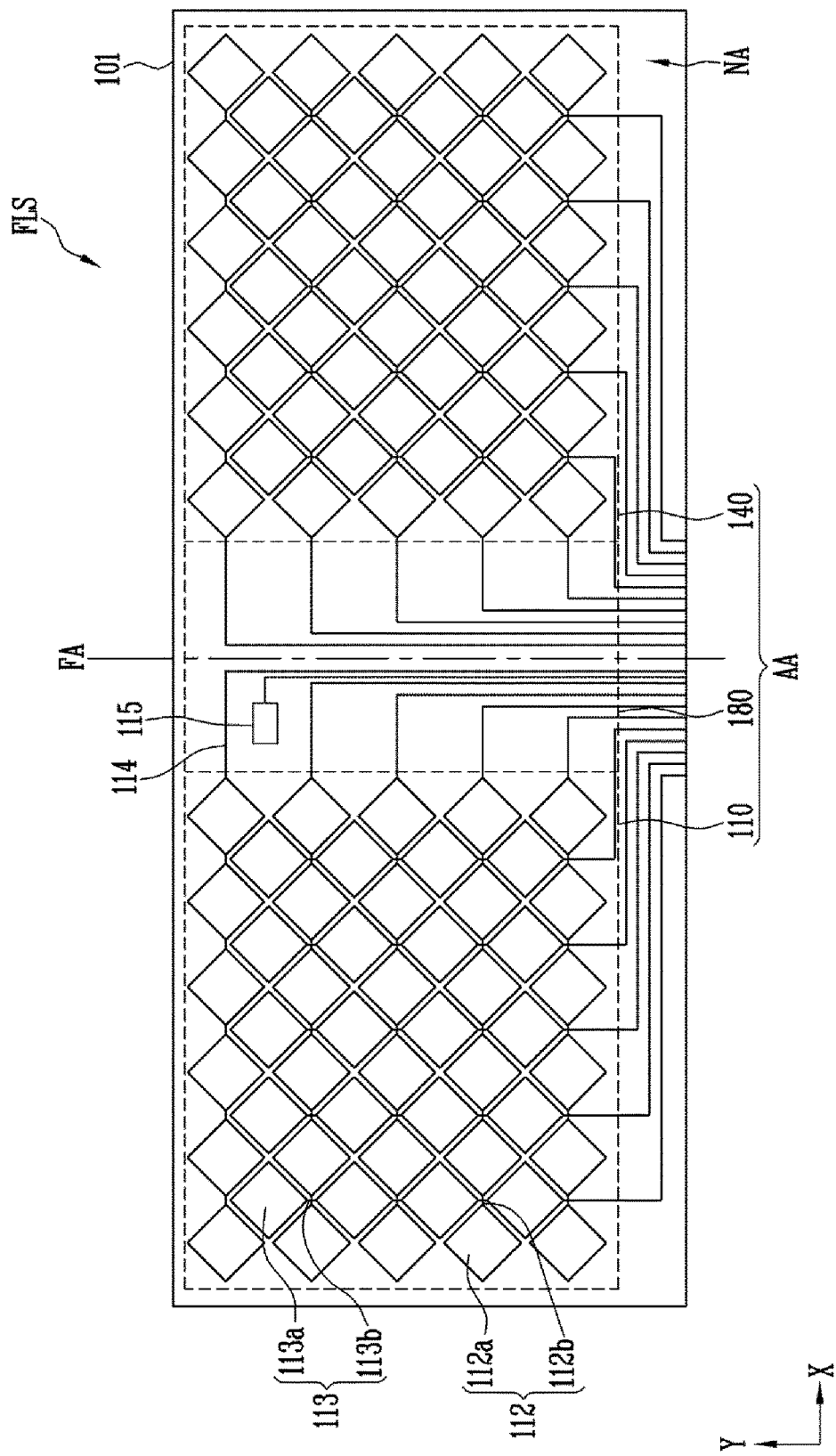
FIG. 20 illustrates still another exemplary embodiment of a foldable sensor unit.

In an exemplary embodiment of the invention, at least one of the first, second, and third sensor units 110, 140, and 180 may include a sensor of different type or structure from the remaining sensor units 110, 140, and 180. For example, in an exemplary embodiment as shown in FIG. 20, the first and second electrodes 112 and 113 or the electrodes 142 as shown in FIG. 18 may be provided only in the first and second sensor units 110 and 140. In addition, in the area of the third sensor unit 180, another type of sensor such as one or more pressure sensors 115 may be disposed to provide a side surface touch function.

Figure 21:
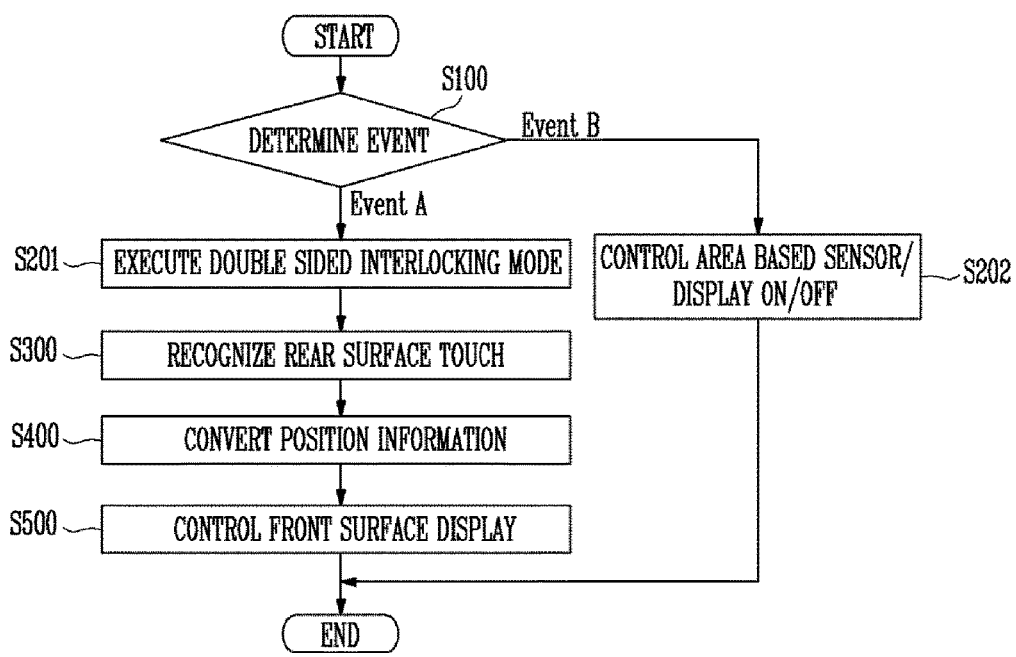
FIG. 21 illustrates an exemplary embodiment of a method of driving a display device.

FIG. 21 illustrates an exemplary embodiment of a method of driving a display device.

Referring to FIG. 21, a method of driving a display device according to an embodiment of the invention may include an event determination step S100, a double-sided interlocking mode execution step S201, and an area-based sensor or display on/off step S202, a rear surface touch recognition step S300, a position information conversion step S400, and a front display control step S500.

More specifically, when a predetermined control signal is supplied to the display device, the event determination step S100 for checking the control signal may be executed. That is, in the event determination step S100, the predetermined control signal may be supplied and the type of an event or an operation to be performed may be determined by checking the predetermined control signal.

According to an exemplary embodiment, when the control signal is applied to instruct execution of the double-sided interlocking mode ("Event A"), the double-sided interlocking mode execution step S201 may be performed. According to an exemplary embodiment, when the control signal instructs to control on/off states of at least one of the first, second, and third sensor units 110, 140, and 180 and the first and second display units 120 and 130 ("Event B"), the area-based sensor or display on/off step S202 may be executed. After the area-based sensor or display on/off step S202 is executed, the execution of the corresponding event, Event B, may be completed and terminated. According to an exemplary embodiment, Event A and Event B may be simultaneously or sequentially executed or Event A and Event B may be independently executed. In the exemplary embodiment of the FIG. 21, the method of driving the display device according to the two events is disclosed as an example, but the type of the event may be various.

When the double-sided interlocking mode is executed, the rear surface touch recognition step S300, the position information conversion step S400, and the front surface display control step S500 may be sequentially executed.

According to an exemplary embodiment, the rear surface touch recognition step S300 may include receiving the touch input provided to the second sensor unit 140 disposed on the rear surface of the display device and analyzing the received touch input to detect the position of the touch input. When the rear surface touch recognition step S300 is completed, the position information conversion step S400 may be executed.

According to an exemplary embodiment, to convert the position information of the detected touch input, the position information conversion step S400 may include mapping the position of the touch input detected in the rear surface touch recognition step S300 into one area on the first display unit 120 disposed on the front surface of the display device. When the position information conversion step S400 is completed, the front surface display control step S500 may be executed.

According to an exemplary embodiment, the front surface display control step S500 may include controlling the first display unit 120 corresponding to the position information converted in the position information conversion step S400.

In the method of driving the display device according to the exemplary embodiment of the invention described above, various driving methods described in the foregoing exemplary embodiments may be applied. In an exemplary embodiment, for example, the predetermined control signal for executing the double-sided interlocking mode may be generated, and the double-sided interlocking mode may be executed in response to the control signal corresponding to the predetermined touch input provided to the third sensor unit 180 disposed on the side surface of the display device. In addition, according to an exemplary embodiment, the inconvenience of use caused by an operation based on an unintended touch input may be effectively prevented by turning off the third sensor unit 180 when the double-sided interlocking mode is executed. In addition, according to an exemplary embodiment, the fingerprint information of a user may be generated in real time by using the fingerprint sensor provided in the display device and identifying an effective touch input provided to the second sensor unit 140 corresponding to the fingerprint information. Therefore, such a method improves the accuracy of touch recognition and the usability.

In a display device and a method of driving the display device according to an exemplary embodiment of the invention, a touch input and a display function may be provided on at least both surfaces of the display device, and a sensor unit and a display unit, which are provided on different surfaces of the display device from each other, may be interlocked, so that the usability may be improved efficiently.

Further, in a display device and a method of driving the display device according to an exemplary embodiment of the invention, the accuracy of touch recognition may be improved by determining the type of touch input generated by a second sensor unit on a rear surface.

While the invention has been particularly shown and described with reference to exemplary embodiments thereof, it is to be understood that the invention is not limited to the disclosed exemplary embodiments. It will be apparent to those skilled in the art that various modifications may be made without departing from the scope of the invention.

The scope of the invention should not be limited to the details described in the detailed description of the specification, but should be defined by the claims. In addition, all changes or modifications derived from the meaning and scope of the claims and their equivalents should be construed as being included within the scope of the invention.

What is claimed is:

1. A display device, comprising:
   a first display unit and a first sensor unit provided on one surface of the first display unit;
   a second display unit and a second sensor unit provided on one surface of the second display unit, the second display unit being different from the first display unit;
   a third sensor unit provided between the first sensor unit and the second sensor unit; and
   a driver unit including a display driver which controls the first display unit and the second display unit, a sensor driver which controls the first, second and third sensor units, and a mapping controller which maps a position information of a touch input detected from a sensing signal of the second sensor unit into a corresponding position information on the first display unit in a double-sided interlocking mode, and into a corresponding position information on the second display unit when the double-sided interlocking mode is not executed.

2. The display device of claim 1, wherein the mapping controller is activated in response to a sensing signal of the third sensor unit.

3. The display device of claim 1, wherein the sensor driver turns off the third sensor unit when the double-sided interlocking mode to activate the mapping controller is executed.

4. The display device of claim 1, wherein the sensor driver activates a partial area of the second sensor unit and turns off remaining areas of the second sensor unit when the double-sided interlocking mode to activate the mapping controller is executed.

5. The display device of claim 1, wherein the mapping controller is activated in response to a sensing signal input from at least one of the first and second sensor units or a control signal input from a predetermined option key.

6. The display device of claim 1, wherein the driver unit controls an image or contents displayed on a screen of the first display unit based on the position information output from the mapping controller.

7. The display device of claim 1, wherein the driver unit displays a point mapped on a screen of the first display unit based on the position information output from the mapping controller.

8. The display device of claim 1, wherein the first and second sensor units are disposed opposite to each other with respect to the first and second display units which are interposed therebetween, and the third sensor unit is disposed on a same side surface of the first and second display units and connected between the first and second sensor units.

9. The display device of claim 1, wherein the first and second display units are integrally connected to be included in one foldable display panel together, and the first, second, and third sensor units are integrally connected to be provided on one surface of the foldable display panel.

10. The display device of claim 9, wherein the display device is folded along a predetermined folding axis arranged on an area of the third sensor unit.

11. The display device of claim 1, wherein the first sensor unit includes a mutual capacitive touch sensor, and the second sensor unit includes a self-capacitive touch sensor.

12. The display device of claim 1, further comprising a fingerprint sensor provided on at least one of the second display unit and the second sensor unit.

13. The display device of claim 12, wherein the driver unit further comprises a fingerprint identification unit which identifies an effective touch input provided to the second sensor unit by using fingerprint information detected from the fingerprint sensor.

14. The display device of claim 1, wherein a touch input provided to the third sensor unit is classified as a plurality of touch events, and a predetermined operation is performed based on each of the plurality of touch events.

15. The display device of claim 14, wherein on/off states of at least one of the first and second display units, and the first, second, and third sensor units are controlled based on each of the plurality of touch events.

16. The display device of claim 14, wherein touch inputs successively provided to the third sensor unit within a predetermined time are counted and the predetermined operation is performed based on the count.

17. The display device of claim 1, wherein the driver unit activates the mapping controller in response to a predetermined control signal and controls the first display unit based on the corresponding position information.

18. A method of driving a display device including a first display unit and a second display unit overlapping each other, a first sensor unit and a second sensor unit provided on respective surfaces of the first and second display units, and a third sensor unit provided on side surfaces of the first and second display units, the method comprising:
  receiving a control signal;
  executing a double-sided interlocking mode in response to the control signal;
  receiving a touch input provided to the second sensor unit and detecting a position of the touch input;
  mapping and converting the position information of detected touch input into a corresponding area information on the first display unit;
  controlling the first display unit based on the corresponding area information;
  controlling the second display unit based on the corresponding area information when the control signal instructs termination of the double-sided interlocking mode.

19. The method of claim 18, further comprising generating the control signal based on a touch input provided to the third sensor unit.

20. The method of claim 18, wherein the third sensor unit is turned off when the double-sided interlocking mode is executed.

21. The method of claim 18, further comprising generating fingerprint information by using a fingerprint sensor and identifying an effective touch input provided to the second sensor unit based on the fingerprint information.

* * * * *